UNITED STATES PATENT OFFICE.

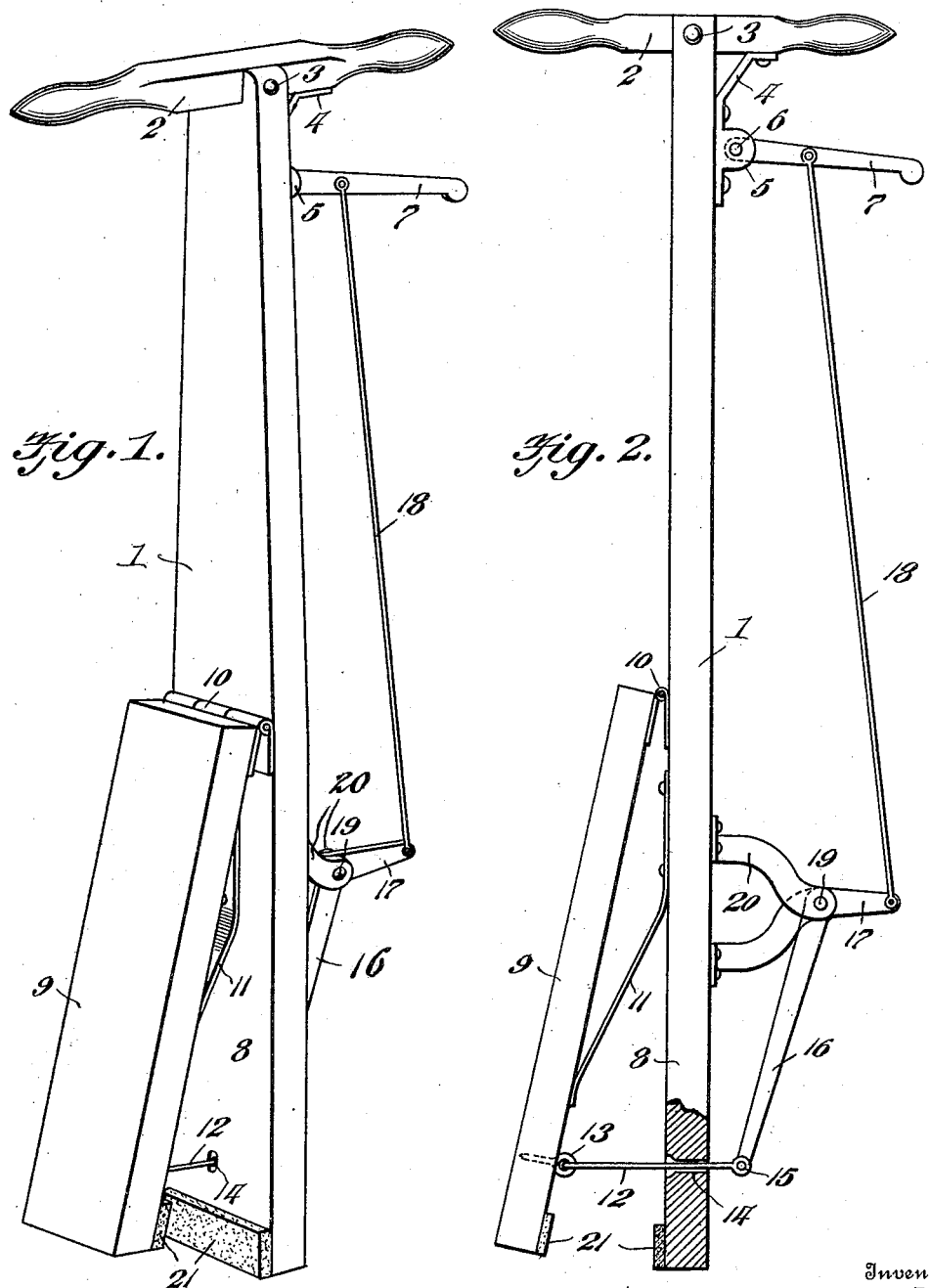

CHARLES B. RHOADES, OF VERDIERVILLE, VIRGINIA.

CORN-THINNER.

No. 914,307.  Specification of Letters Patent.  Patented March 2, 1909.

Application filed April 28, 1908. Serial No. 429,631.

*To all whom it may concern:*

Be it known that I, CHARLES B. RHOADES, a citizen of the United States, residing at Verdierville, in the county of Orange and State of Virginia, have invented new and useful Improvements in Corn-Thinners, of which the following is a specification.

This invention relates to corn thinners or implements for thinning out corn and other plants, the object of the invention being to provide a hand-operated portable device embodying a construction which is simple, economical and not liable to get out of order.

With the above and other objects in view, the invention consists in the novel construction, combination and arrangement of parts as herein fully described, illustrated and claimed.

In the accompanying drawings:—Figure 1 is a perspective view of a corn thinner embodying the present invention. Fig. 2 is a side view thereof partly in section.

The implement comprises a main body or stock 1 to the upper end of which is secured a T-handle 2 bolted thereto as shown at 3 and further connected with the body by means of an interposed angle brace 4. This brace is provided with outwardly extending lugs 5 between which is pivotally secured the inner end of a hand lever 7 the purpose of which will hereinafter appear.

The lower end of the body 1 forms the fixed jaw 8 of the thinning implement while opposite to the jaw 8 there is hinged a jaw 9, the latter being hinged at its upper end to the stock 1 as shown at 10. Between the fixed and movable jaws there is a jaw opening spring 11 one end of which is secured to one of the jaws while the opposite or free end thereof bears and slides against the other jaw. A jaw-closing rod 12 is connected at one end to the movable jaw 9 as shown at 13 and passes through an opening 14 in the other jaw where it connects pivotally at 15 to the arm 16 of an elbow lever, the other arm 17 of which has attached thereto one end of a rod 18 the opposite end of which is attached to the hand lever 7. The elbow lever is fulcrumed at 19 on a pair of bracket arms 20 secured to the fixed jaw and extending backward therefrom and embracing the elbow lever on opposite sides as clearly shown in the drawings.

21 designates blocks or facings of flexible material such as leather or rubber, applied to the working faces of the jaws and adapted to obtain a firm frictional hold upon the stalk of the corn or other plant to be extracted, it being understood that the jaws are moved toward each other to grip the stalk or plant by an upward pull on the hand lever 7.

I claim:—

The herein described thinning implement comprising a flat-sided stock, having a T-handle at one end, the opposite end forming a broad flat gripping jaw, a flat opposing jaw connected at its upper end to the stock by a hinge, a jaw opening leaf spring interposed between the jaws, an elbow lever fulcrumed on the back of the first-named jaw, a rod extending from the elbow lever through one jaw and connected to the opposite jaw near the gripping extremity thereof, a hand lever adjacent to the main handle, a bracket on which said hand lever is fulcrumed secured to the stock and embodying an angle brace which connects the stock and handle, and a rod extending from said hand lever to the elbow lever.

In testimony whereof I affix my signature in presence of two witnesses.

CHARLES B. RHOADES.

Witnesses:
  GEORGE B. SEELY,
  CHARLES S. SEELY.